April 19, 1949. R. S. BIGELOW 2,467,957
CONNECTING MEANS FOR SHAKER CONVEYER TROUGHS
Filed Feb. 8, 1946 2 Sheets-Sheet 1

INVENTOR
Roy S. Bigelow
Clarence T. Poole
ATTORNEY

April 19, 1949.  R. S. BIGELOW  2,467,957
CONNECTING MEANS FOR SHAKER CONVEYER TROUGHS
Filed Feb. 8, 1946  2 Sheets-Sheet 2
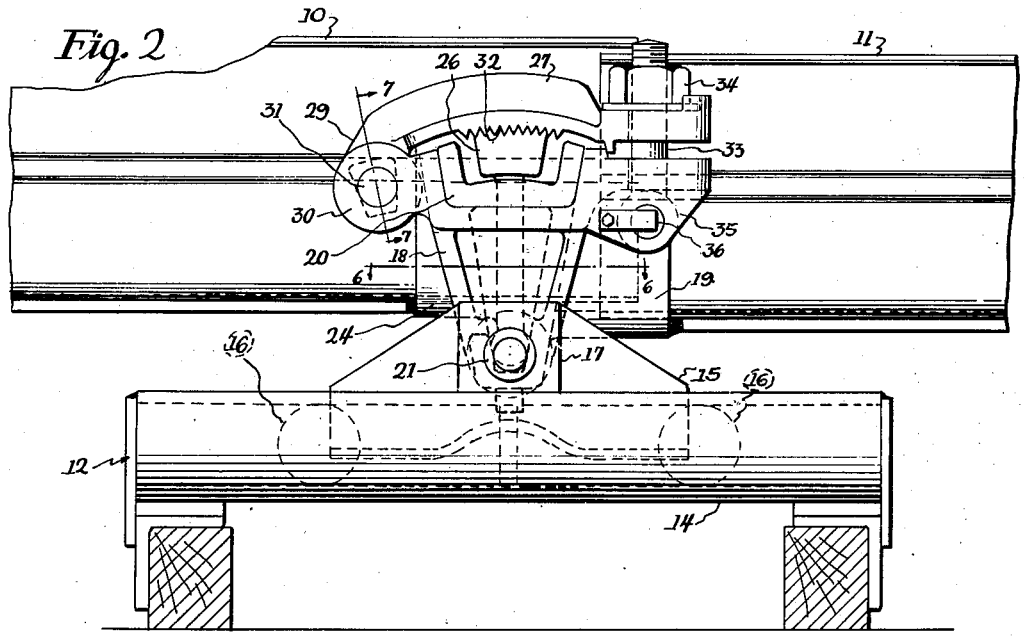
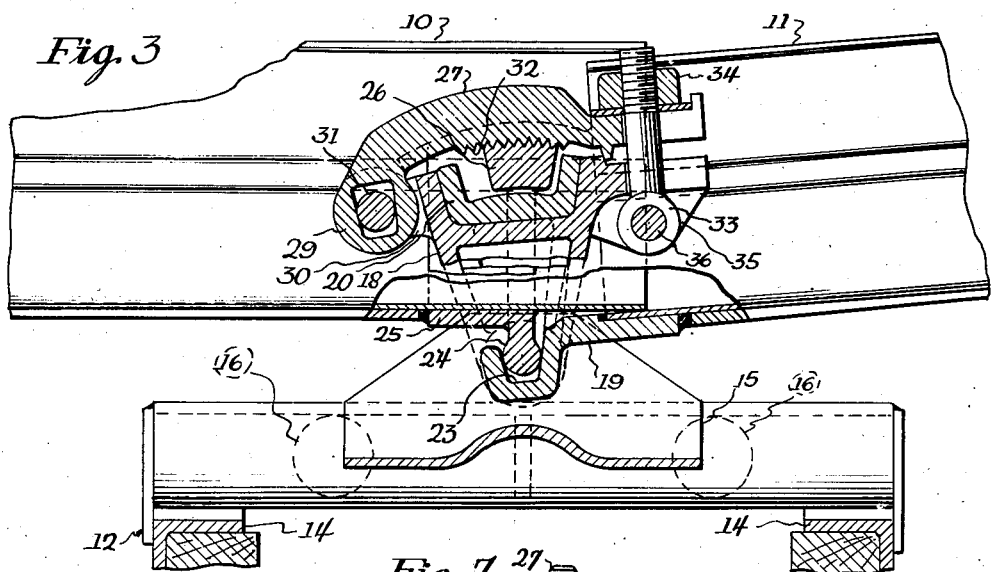
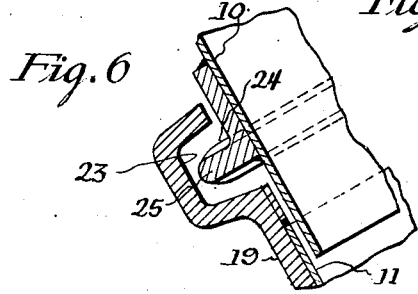
INVENTOR
Roy S. Bigelow
Clarence F. Poole
ATTORNEY Patented Apr. 19, 1949

2,467,957

UNITED STATES PATENT OFFICE 2,467,957

CONNECTING MEANS FOR SHAKER CONVEYER TROUGHS

Roy S. Bigelow, Chicago, Ill., assignor to Goodman Manufacturing Company, Chicago, Ill., a corporation of Illinois Application February 8, 1946, Serial No. 646,327

2 Claims. (Cl. 198—220)

This invention relates to improvements in connecting means for shaker conveyor troughs and more particularly relates to a quickly detachable trough connecting means permitting the trough line to follow an uneven floor.

The principal objects of my invention are to provide a novel form of quick acting connecting means for the troughs of a shaker conveyor having a large connecting bearing area so constructed as to permit the troughs to be arranged at angles with respect to each other, to conform to an uneven mine bottom, and holding the troughs in fixed relation with respect to each other during reciprocation of the conveyor.

These and other objects of my invention will appear from time to time as the following specification proceeds and with reference to the accompanying drawings wherein:

Figure 2 is an enlarged view in side elevation of the troughs shown in Figure 1;

Figure 3 is a view in side elevation showing the troughs arranged at an angle with respect to each other and showing certain parts of the connecting means therefor in substantially longitudinal section;

Figure 6 is a detail fragmentary sectional view taken substantially along line 6—6 of Figure 2; and Figure 7 is a detail fragmentary sectional view taken substantially along line 7—7 of Figure 2.

Figure 1:
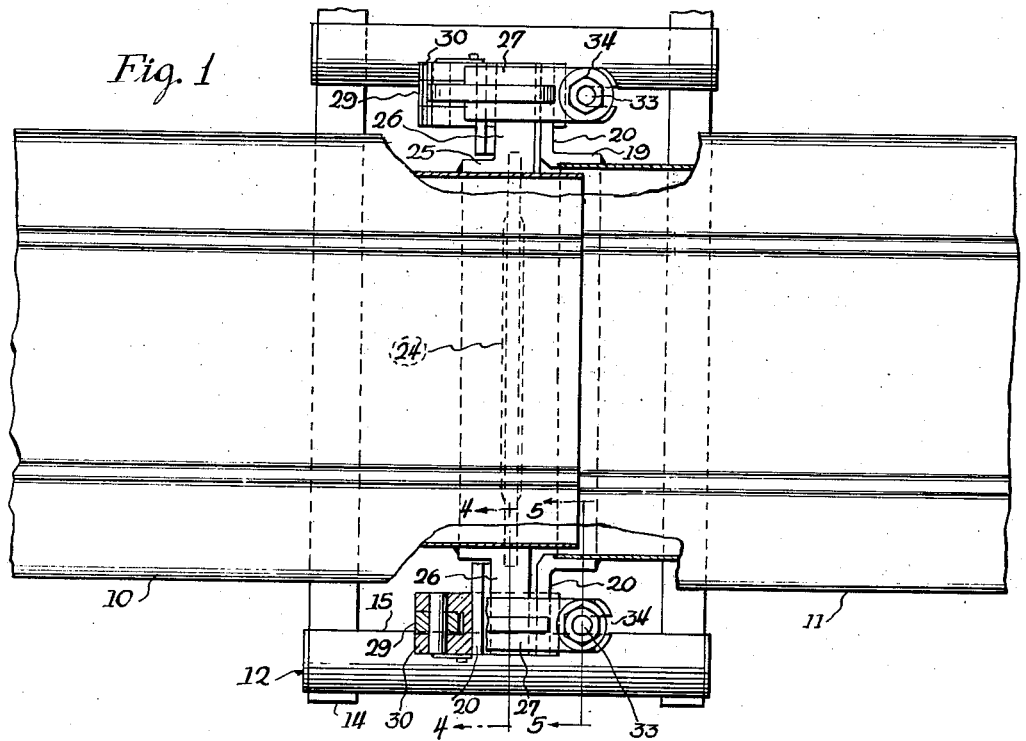
Figure 1 is a plan view showing adjacent ends of two troughs of a shaker conveyor with certain parts of the troughs broken away and shown in substantially horizontal section in order to illustrate certain details of the trough connecting means therefor.

In the embodiment of my invention illustrated in the drawings, adjacent ends of two shaker conveyor troughs 10 and 11 are shown as being connected together in overlapping relation with respect to each other and mounted on a ball frame 12. Said troughs are of a usual construction having a flat bottom and outwardly inclined flared sides, and while herein shown as being connected in overlapping relation, the connecting means therefor may also be so arranged as to connect said troughs in abutting relation, where it is desired that the conveyor be reversible.

The ball frame 12 may be of any well known form and is herein shown as including a lower frame member 14 suitably held in fixed relation with respect to the ground during operation of the conveyor and as having an upper frame member 15 mounted on and guided for reciprocable movement therealong on balls 16, 16.

Figures 4, 5:
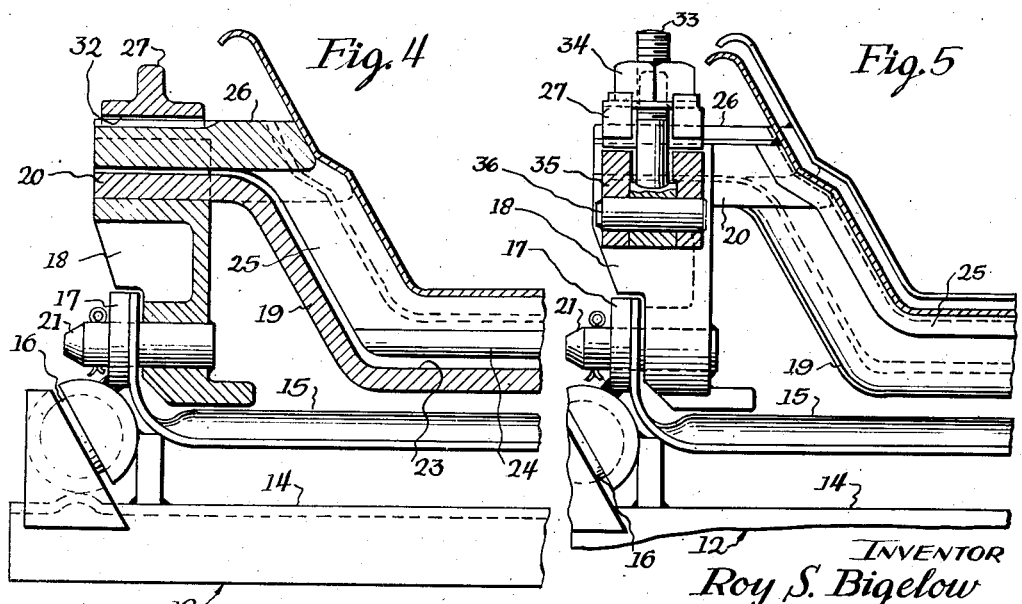
Figure 4 is a fragmentary transverse sectional view taken substantially along line 4—4 of Figure 1.
Figure 5 is a fragmentary transverse sectional view taken substantially along line 5—5 of Figure 1.

The upper frame member 15 is provided with a pair of longitudinally extending laterally spaced upright ears 17, 17 at opposite sides thereof and spaced laterally from opposite sides of the troughs 10 and 11 (see Figure 4). Said ears are each adapted to form a pivotal support for a supporting leg 18 of a recessed connecting member 19. Said connecting member is secured to the bottom of the trough 11 and extends thereacross and upwardly along opposite sides thereof and laterally therefrom. As shown in Figure 4, said supporting legs have upper recessed portions corresponding to laterally projecting portions 20, 20 of said recessed connecting member and are adapted to have said laterally projecting portions set therein, and held therein by a clamping member 27, the details of which will hereinafter more clearly appear as this specification proceeds. A pivotal pin 21 is mounted in each of said supporting legs adjacent the lower end thereof. Said pins project outwardly from said legs and are pivotally mounted in the ears 17, 17.

The recessed connecting member 19 has a channel or socket 23 spaced beneath and forwardly of the end of the trough 11 and extending across the bottom thereof. Said channel is of a wedge-shaped formation and is adapted to receive an arcuate depending tongue 24 of a rocking connecting member 25 secured to an adjacent end of the trough 10 and depending therefrom and adapted to rock within said socket when initially setting up the trough line. Said socket extends across the bottom of the trough 11 and upwardly along opposite sides thereof and laterally therefrom.

The connecting member 25 likewise extends across the bottom of the trough 10 and upwardly along opposite sides thereof, and has laterally extending upper portions 26, 26 extending within the laterally projecting socket portions 20, 20 of said connecting member 19, as is shown in Figures 2 and 3.

The upwardly extending side portions and the laterally projecting portions of the socket 23 diverge from the lower portion thereof at an angle, to provide clearance between the side portions of said recessed connecting members and the connecting member 25. Clearance is likewise provided between the laterally projecting portions 26, 26 and 20, 20. The tongue 24 of the connecting member 25 may thus rock within the socket 23, to permit angular adjustment of the troughs with respect to each other.

In setting up the conveyor trough line, the forward or receiving end of the trough 11 is first rockingly mounted on the ears 17, 17 of the ball frame 12 on the supporting legs 18, 18. The trough 10 is then connected to the trough 11 by dropping the tongue 24 of the connecting member 25 into engagement with the socket 23 of the connecting member 19. Thus, when the trough 11 is mounted at its discharge end on a ball frame like the ball frame 12 by a connecting member 25 engaging the socket of a connecting member like the connecting member 19 on the receiving end of another trough of the conveyor, and the trough 10 is mounted at its receiving end on a ball frame by a connecting member similar to the connecting member 19, the two troughs may adapt themselves to an uneven floor.

The clamping members 27, 27 are provided to hold the laterally projecting portions 20, 20 of the connecting member 19 to the legs 18, 18 and to hold the tongue 24 in fixed relation with respect to the socket 23 during reciprocation of the conveyor, and maintain the joints between the troughs of the conveyor relatively rigid so as to prevent buckling of the trough line when heavy loads are placed thereon. Each of said clamping members is provided with a depending apertured end portion 29 extending between the furcations of a bifurcated ear 30, projecting longitudinally from the upper portion of an associated leg 18 supporting one end of the connecting member 19, and is connected to said bifurcated ear by means of a pivotal pin 31. Clearance is provided between the apertured portion of said clamping member and said pivotal pin, to permit a certain amount of freedom of vertical movement between said link and ear, to facilitate connection of the troughs. Said clamping member is provided with an under serrated engaging surface 32 adapted to engage a corresponding upper serrated surface of the laterally projecting portion 26 of the connecting member 25. An eyebolt 33 having a nut and washer indicated at 34 threaded on its upper end, is provided to hold said clamping member in clamping engagement with said laterally projecting portion of said connecting member. As herein shown, the eye of said eyebolt extends between the furcations of a depending longitudinally extending bifurcated ear 35 of the supporting leg 18, and is pivotally connected thereto by means of a pivotal pin 36. The end of said clamping member is slotted and opens to the outer end thereof, to permit said eyebolt to be pivoted upwardly about the pin 36 into said slotted portion, so the washer 34 may be brought into engagement with said clamping member by its associated nut, to hold said clamping member into engagement with said laterally projecting portion of the connecting member 25 and to positively engage the tongue 24 with the socket 23, to hold the troughs in rigid relation with respect to each other during reciprocation of the conveyor.

It may be seen from the foregoing that a simplified connecting means has been provided for connecting the troughs of a shaker conveyor together, which is so arranged as to have a large connecting bearing area and which permits the troughs to be connected at varying angular relations with respect to each other, to conform to an uneven mine bottom, and makes it unnecessary to shim up the troughs at the joints therebetween to connect them in the proper angular relation with respect to each other where the mine floor is uneven. It may further be seen that the troughs may be connected together in a simple manner by setting the projecting tongue 24 in the socket 23 and permitting one trough to rock on its ball frame and the other trough to rock within said socket and adapt themselves to the mine bottom, and that a quick acting clamping means is provided to firmly clamp said projecting tongue 24 within the socket 23 and hold the troughs in rigid relation with respect to each other.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A connecting means particularly adapted to connect adjacent ends of the troughs of a shaker conveyor together including a recessed member secured to an end of one trough of the conveyor and having an elongated socket extending transversely thereof, a connecting member secured to an adjacent end of a next adjacent trough of the conveyor and having an elongated arcuate engaging surface extending transversely thereof and adapted to extend within said socket and to have rocking engagement therewith, to connect said troughs together and permit them to adapt themselves to an uneven floor, a clamping member pivotally connected with one of said members and adapted to have clamping engagement with the other of said members, and a securing member operable to hold said clamping member in selected positions of clamping engagement with the other of said members and to hold said troughs in fixed positions of adjustment with respect to each other.

2. A connecting means particularly adapted to connect adjacent ends of the troughs of a shaker conveyor together including a recessed member secured to an end of one trough of the conveyor, a connecting member secured to an adjacent end of a next adjacent trough of the conveyor, said recessed member having an elongated socket spaced downwardly from its associated trough and having inclined sides extending transversely of said trough, and said connecting member having an elongated transverse arcuate engaging surface depending from its associated trough and adapted to engage the inclined sides of said socket and connect adjacent ends of said troughs together and permit said troughs to rock about their adjacent ends and conform to an uneven floor, a clamping member for holding said arcuate engaging surface of said connecting member in engagement with the sides of said socket and holding adjacent ends of said troughs in fixed relation with respect to each other, said clamping member having pivotal connection with one of said members and movable into position to have clamping engagement with the other of said members, and a securing member pivotally connected with said one member and engageable with said clamping member to hold said clamping member in selective positions of clamping engagement with the other of said members.

ROY S. BIGELOW.

REFERENCES CITED

The following references are of record in the file of this patent:

UNITED STATES PATENTS

| Number | Name | Date |
|---|---|---|
| 2,414,710 | Bigelow | Jan. 21, 1947 |